United States

Reintjes, Jr. et al.

[11] 3,936,770
[5] Feb. 3, 1976

[54] SINGLE LASER CAVITY FOR GENERATING TE OR TM MODES

[75] Inventors: John Francis Reintjes, Jr., Alexandria, Va.; James Jeffrey Wynne, Mount Kisco, N.Y.

[73] Assignee: International Business Machines Corporation, Armonk, N.Y.

[22] Filed: Dec. 28, 1973

[21] Appl. No.: 429,409

[52] U.S. Cl. ............................. 331/94.5 C; 350/157
[51] Int. Cl.² ..................... H01S 3/082; H01S 3/098
[58] Field of Search...................... 331/94.5; 330/4.3; 350/157

[56] References Cited
UNITED STATES PATENTS
3,777,280   12/1973   Pohl.................................. 331/94.5

OTHER PUBLICATIONS

Anan'ev et al., Soviet Physics Doklody, 13,(4), Oct. 1968, pp. 351–352.

Pohl, Physical Review A,5(4) Apr. 1972, pp. 1906–1908.

Pohl, Applied Physics Letters, 20,(7), 1, Apr. 1972, pp. 266–267.

*Primary Examiner*—Robert J. Webster
*Attorney, Agent, or Firm*—George Baron

[57] ABSTRACT

A dye laser, pumped by a nitrogen laser, has been made to operate in both the $TE_{01}$ and $TM_{01}$ rotationally symmetric modes, regardless of the variation in laser wavelength. By changing the spacing of lenses within the optical cavity, the single laser can be made to switch from the $TE_{01}$ mode to the $TM_{01}$ mode and back again to the $TE_{01}$ mode.

8 Claims, 6 Drawing Figures

SINGLE LASER CAVITY FOR GENERATING TE OR TM MODES

BACKGROUND OF THE INVENTION

In a U.S. Pat. No. 3,777,280 issued on Dec. 4, 1973 to Dieter Pohl and assigned to applicants' assignee, the $TE_{01}$ mode is favored whereas the other modes are suppressed. This discrimination is achieved by employing in the laser cavity a birefringent crystal, zero degree cut calcite, which deflects the beams in the crystal so as to suppress the $TM_{01}$ mode but favor the $TE_{01}$ mode. In such Pohl invention, however, there is no teaching of how to switch back and forth in a single laser from the $TE_{01}$ to the $TM_{01}$ and vice versa.

In yet another teaching (See "Generation of Radially Polarized Optical Beam Mode by Laser Oscillation" by Y. Mushiake et al, Proc. of IEEE, Vol. 60, Sept., 1972, pp. 1107-1109) a He—Ne gas laser was operated in the $TM_{01}$ mode having its magnetic field azimuthally polarized and its electric field radially polarized. By passing the $TE_{01}$ beam through a rotationally symmetric 90° rotator, the $TM_{01}$ mode can be switched to the $TE_{01}$ mode and vice versa. However, Mushiake et al's device has the limitation that the amount of rotation produced by the rotationally symmetric 90° rotator is wavelength dependent.

The present invention achieves the capability of switching back and forth from the $TE_{01}$ mode to the $TM_{01}$ mode so that such switching is independent of the wavelength of the laser. Such wavelength independence is attained by the use of a mode selector which comprises a zero degree calcite crystal inserted between two lenses in the laser cavity. One lens is concave which makes the light strongly divergent as it passes through the calcite. The other lens is convex which recollimates the diverging beam into a parallel beam, the latter being reflected from a mirror or diffraction grating of the optical cavity. The divergent light beam undergoes double refraction in the crystal, which allows for discrimination between $TE_{01}$ and $TM_{01}$ modes. By varying the spacing between the convex and concave lenses, switching between the $TE_{01}$ and $TM_{01}$ mode is achieved that is independent of the wavelength of the oscillating light in the laser cavity.

It is an object of this invention to provide a novel laser capable of selecting either the rotationally symmetric $TE_{01}$ mode or the rotationally symmetric $TM_{01}$ mode.

It is yet another object of this invention to provide such selection capabilities in a laser that is independent of the wavelength of the laser.

BRIEF DESCRIPTION OF THE DRAWINGS

In FIG. 1 is seen the mode selector shown and described by Pohl in the above noted U.S. Pat. No. 3,777,280. To lift the degeneracy between the $TE_{01}$ and $TM_{01}$ modes as well as to discriminate against unwanted modes, the mode selector of FIG. 1 included a zero degree calcite crystal 2 inserted between two lenses 4 and 6. Lens 6 is a concave lens whereas lens 4 is convex. A reflector 8 provides one end of the optical cavity. A laser active medium (not shown) and a partially transmitting output mirror (not shown) complete the laser system. Lens 6 makes the light 12 strongly divergent as it passes through calcite crystal 2 whereas convex lens 4 recollimates the diverging beam 12 into a parallel beam that is reflected back toward lens 4 by reflector 8. the divergent light beam 12 undergoes double refraction in crystal 2, such double refraction serving to discriminate between the $TE_{01}$ and $TM_{01}$ modes in a manner to be described hereinafter.

Figure 1:
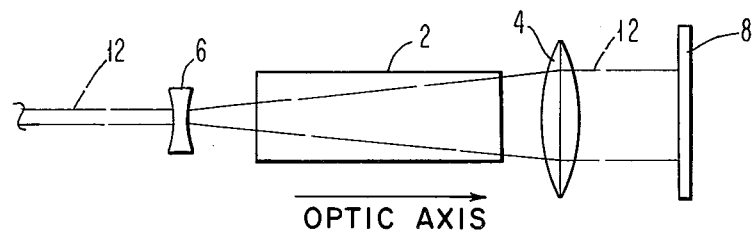
FIG. 1 is a schematic diagram of an azimuthally polarized mode selector scheme.
Figure 2:
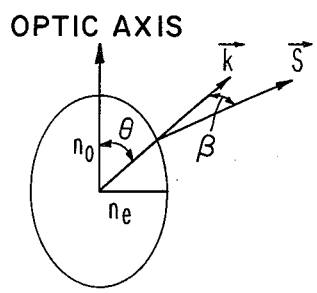
FIG. 2 is a representation of a wave vector surface for a negative uniaxial crystal for the extraordinary wave in that crystal and FIG. 3 is a wave vector surface for the ordinary wave.
Figure 3:
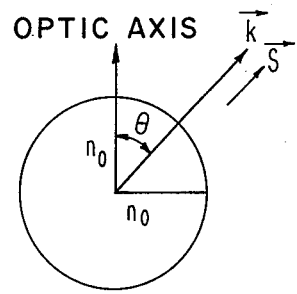
Figure 4:
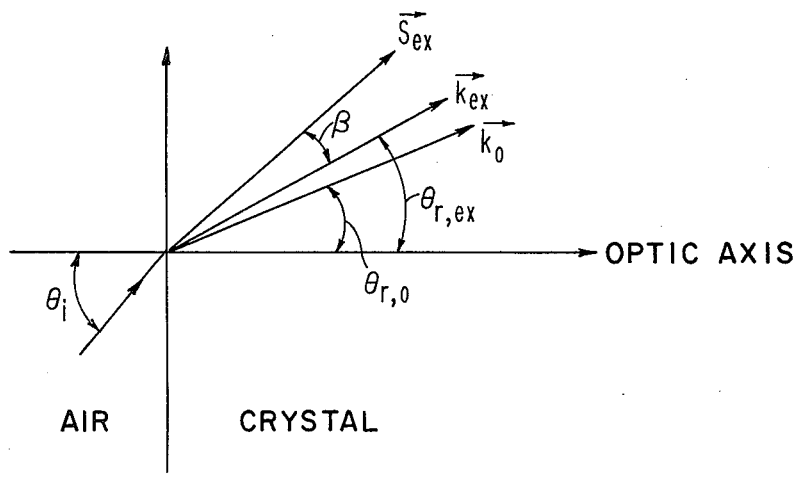
FIG. 4 depicts the refraction of the extraordinary wave and the ordinary wave at the air-crystal interface with respect to a reference line, namely, the optic axis.

A discussion of how such discrimination is achieved is aided by a consideration of FIGS. 2–4. First consider a light beam propagating with its wave vector $\vec{k}$ at an angle, $\theta$, to the optic axis of a uniaxial crystal. It is well known from the study of crystal optics that a uniaxial crystal is birefringent and that the extraordinary wave has a ray vector $\vec{S}$ which is not parallel to $\vec{k}$. $\vec{S}$ is in the direction of energy transport and for a well-defined beam it indicates the direction in which the beam is moving. For the ordinary wave, $\vec{S}$ is parallel to $\vec{k}$. The ordinary wave has its electric field vector perpendicular to the plane containing $\vec{k}$ and the crystal optic axis. The extraordinary wave has its electric field lying in the aforementioned plane. These waves and their wave vectors and ray vectors are illustrated in FIGS. 2 and 3. The important angle $\beta$ is given by the relationship $$\tan \beta = \frac{(n_o^2 - n_e^2) \tan \theta}{n_e^2 + n_o^2 \tan^2 \theta} \tag{1}$$

Here $n_o$ is the ordinary index of refraction and $n_e$ is the extraordinary index of refraction. For a negative uniaxial crystal, such as calcite, $\beta$ is positive so that $\vec{S}$ is bent farther than $\vec{k}$ away from the optic axis. In the limit of small $\theta$, that is for a wave propagating at only a small angle to the optic axis, Eq. (1) becomes $$\beta \cong \theta \left( \frac{n_o^2 - n_e^2}{n_e^2} \right) . \tag{2}$$

Next, consider a light beam incident at an angle, $\theta_i$, on a zero degree cut slab of unixial crystal. Snell's law gives the angle of refraction, $\theta_r$, for entering the crystal. For the ordinary ray we have $$\frac{\sin \theta_{r,o}}{\sin \theta_i} = 1/n_o \tag{3a}$$

For an extraordinary wave we have $$\frac{\sin \theta_{r,ex}}{\sin \theta_i} = \left( \frac{\cos^2 \theta_{r,ex}}{n_o^2} + \frac{\sin^2 \theta_{r,ex}}{n_e^2} \right)^{1/2} \tag{3b}$$

In the limit of small $\theta_i$, Eq. (3a) reduces to $$\theta_{r,o} = \theta_i/n_o \tag{4a}$$

and equation (3b) reduces to $$\theta_{r,ex} = \frac{\theta_i}{n_o} \left( 1 + \frac{\theta_{r,ex}^2}{2} \cdot \frac{n_o^2 - n_e^2}{n_e^2} \right) \tag{4b}$$

and the difference is given by $$\theta_{r,ex} - \theta_{r,o} = \frac{\theta_i}{n_o} \frac{\theta_{r,ex}^2}{2} \left(\frac{n_o^2 - n_e^2}{n_e^2}\right). \tag{5}$$

A light beam (see FIG. 4) is incident at an angle $\theta_i$ on the zero degree cut calcite slab 2. The ordinary component is refracted to an angle $\theta_{r,o}$ and the extraordinary component to $\theta_{r,ex}$. The difference between these is given by Eq. 5. However, the ray direction for the extraordinary wave differs from its wave vector by the angle $\beta$ given by Eq. (2) as $$\beta = \theta_{r,ex} \left(\frac{n_o^2 - n_e^2}{n_e^2}\right) \cong \frac{\theta_i}{n_o} \left(\frac{n_o^2 - n_e^2}{n_e^2}\right) \tag{6}$$

which is seen to be much larger than $\theta_{r,ex} - \theta_{r,o}$. A $TE_{01}$ mode normally incident on the calcite, and made to diverge by passing through a diverging lens, will look like an ordinary wave to the calcite and will be refracted accordingly. A $TM_{01}$ mode will look like an extraordinary wave and undergo double refraction. Its beam divergence will be an angle $\beta$ greater than its angle of refraction.

In the paraxial ray limit, the optical thickness of a plane parallel slab of crystal of thickness t may be taken as the reduced thickness given by dividing t by the index of refraction, provided that double refraction is ignored. But this must be modified in the case of double refraction. By optical thickness, we mean the distance the beam would have to propagate in a vacuum to diverge as much as it does in the given thickness of crystal. Thus we consider the diverging angle within the crystal. For an incident angle $\theta_i$, the divergence angle for an ordinary beam is given in Eq. (4a). For an extraordinary beam the divergence angle is $$\theta_{r,ex} + \beta \cong \theta_{r,o} + \beta \cong \theta_i n_o/n_e^2. \tag{7}$$

The optical thickness is reduced from the real thickness by the same factors which reduce the divergence angle from $\theta_i$, so that for ordinary rays the optical thickness is $t/n_o$ while for extraordinary rays the optical thickness is $tn_o/n_e^2$.

It will now be shown that, under certain conditions, the stability regions for the $TE_{01}$ and $TM_{01}$ modes are mutually exclusive. Consider the cavity configuration depicted in FIG. 5. For any given $d_1$ and $d_3$, the cavity can support stable modes for $d_2$ within the limits $$f_2 - f_1 d_1/(d_1+f_1) > d_2 > f_2 - f_1 \tag{8}$$

(provided that $d_3 \leq f_2$).

The notations $d_1$, $d_2$ and $d_3$ refer to optical thicknesses rather than to real distances. The lower limit is the confocal geometry, where the foci of the two lenses 4 and 6 coincide. In this limit the mode has expanded to infinite size throughout the laser cavity. The upper limit corresponds to the geometric optics case of the focal plane of the two lens system coinciding with reflector 10. Thus the mode has an infinitesimal spot size on reflector 10 and expands to infinite size (by diffraction) throughout the laser cavity. The focal length of positive lens 4 is $f_2$, and $f_1$ is the negative of the focal length of negative lens 6.

If the range between the limits (denoted by D in FIG. 6) is less than the difference in the optical thickness of calcite 2 between the $TE_{01}$ and $TM_{01}$ modes, D', then the ranges of stability for these two modes are mutually exclusive. The ranges of low loss laser operation in a stable mode may be further reduced by aperturing effects. Note that the range permitted for $d_2$ (FIG. 5) is largest in the limit of very small $d_1$.

As a concrete example, for a piece of calcite $t=2$ cm thick, with $n_o=1.660$ and $n_e=1.487$ at $\lambda=5600$ A, $t/n_o=1.20$ cm and $tn_o/n_e^2=1.50$ cm, a difference of 3 mm. Now choosing $d_1=40$ mm, $d_3=40$ mm, $f_1=8$ mm and $f_2=75$ mm, Eq. (8) gives the stability limits of $d_2$ (ignoring aperture effects) as 67 mm and 68.3 mm, a difference of 1.33 mm. Thus D=1.3 mm is less than D'=3 mm as is required for mutual exclusion of the ranges of stability of the $TE_{01}$ and $TM_{01}$ modes. This implies that if the laser and mode selector are set to operate in the $TE_{01}$ mode, then by decreasing the separation of the lenses by 3 mm, the laser will operate in the $TM_{01}$ mode with the same mode size, etc. Alternatively, one can insert a plane parallel slab of glass thick enough to reduce the total optical thickness between lenses by 3 mm in order to switch from $TE_{01}$ to $TM_{01}$.

Figure 5:
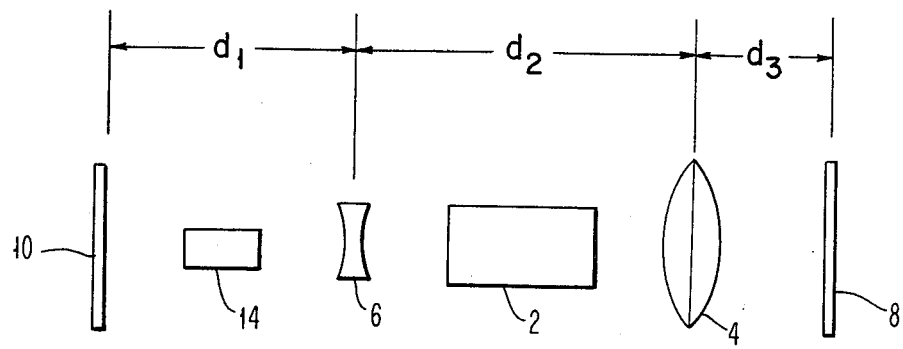
FIGS. 5 and 6 are embodiments of the invention.
Figure 6:
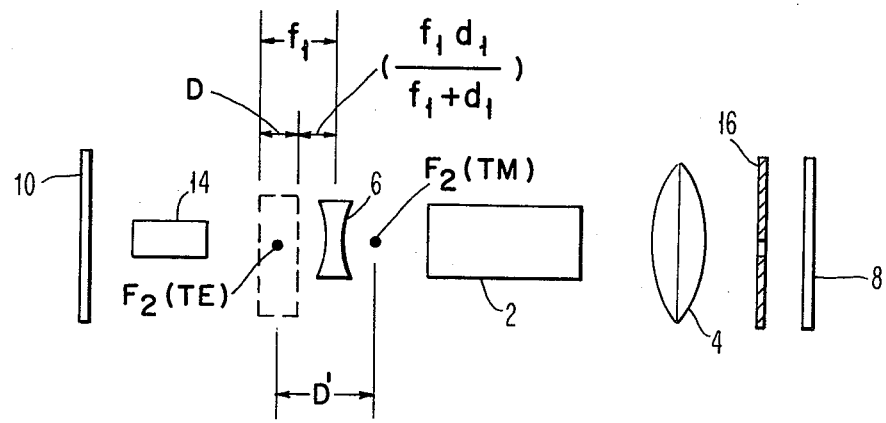

To implement the invention, a laser was constructed with the values for the parameters of FIG. 5 given in the previous paragraph. The laser consisted of a nitrogen-laser-pumped dye cell 14 placed between a flat output coupling reflector 10 and the diverging lens 6. The calcite slab 2 was placed between this lens and the converging lens 4, and a reflector 8 consisting of a diffraction grating was placed adjacent to the converging lens 4. With all of the optics correctly aligned, but with the spacing of the lenses 4 and 6 at about 80 mm, no lasing was observed. As the lens spacing (and therefore $d_2$) was reduced (see FIG. 5) laser oscillation occurred, and when the output spot was reasonably bright and collimated, it was observed to have a characteristic doughnut-shaped intensity distribution. A linear polarizer showed this to be the $TE_{01}$ mode. By tilting the diffraction grating 8, the output wavelength of the laser (utilizing an ethanol solution of brilliant Sulfaflavin) was tuned between 5000 A and 5500 A, and the intensity pattern and $TE_{01}$ polarization were preserved. As the lens spacing was further reduced, laser oscillation ceased until the lenses 2 and 4 had been moved approximately 3 mm closer together. Laser action then reappeared with the same doughnut-shaped intensity distribution. However, a linear polarizer now showed that the mode was $TM_{01}$. Both the $TE_{01}$ and $TM_{01}$ modes appeared in the absence of any additional apertures or stops. The small cross section of the actively pumped dye solution acted as the limiting aperture. By inserting an adjustable iris diaphragm 16 between the grating and the converging lens, the laser intensity pattern was "cleaned up" with an accompanying decrease in total power.

This mode selector and cavity geometry are suitable for many different lasers. In applications where it is desired to have $TE_{01}$ and/or $TM_{01}$ modes, such as in wave-guided optical data transmission, this mode selector will be very useful.

While the invention has been particularly shown and described with reference to preferred embodiments thereof, it will be understood by those skilled in the art that the foregoing and other changes in form and details may be made therein without departing from the spirit and scope of the invention.

What is claimed is:

1. A laser cavity generator for generating either the rotationally symmetric TE or TM mode comprising
    two light reflectors facing each other to form the outer boundaries of an optical resonant cavity, a laser medium in said cavity adjacent one of said reflectors, a convex lens and a concave lens located between said laser medium and said other light reflector, a birefringent material inserted between said lenses, and means for varying the optical thickness between said lenses for alternatively generating the TE mode or the TM mode.

2. The generator of claim 1 wherein said laser medium is a tunable dye laser.

3. The generator of claim 1 wherein said birefringent material has an optic axis that is parallel to the laser resonant cavity axis.

4. The generator of claim 1 wherein said birefringent material is a uniaxial crystal.

5. The generator of claim 3 wherein said birefringent material is a zero degree cut uniaxial crystal.

6. The generator of claim 5 wherein said zero degree cut uniaxial crystal is a calcite crystal.

7. A laser cavity generator capable of generating either the rotationally symmetric TE or TM mode comprising two reflectors in said laser cavity generator and facing each other to form the outer boundaries of an optical resonant cavity having an axis, a laser medium in said cavity adjacent to a first reflector, a concave lens, a birefringent material whose optic axis is coaxial with said laser axis and a convex lens, in that order, located to the right of said laser medium and also within said laser cavity, with $d_1$ being the optical thickness between said first reflector and said concave lens whose focal length is $f_1$, $d_2$ being the optical thickness between the said concave lens and said convex lens whose focal length is $f_2$ and $d_3$ being the optical thickness between the second reflector of said cavity and said convex lens, and means for moving said lenses with respect to each other along said axis so as to achieve stability for both TE and TM modes exclusive of each other so long as $$f_2 - f_1 \quad (\frac{d_1}{d_1 + f_1}) > d_2 > f_2 - f_1 \text{ and } d_3 \leq f_2,$$

and the value of $d_2$ for the TE mode differs from the value of $d_2$ for the TM mode.

8. The mode generator of claim 7 wherein a diffraction grating is employed as the second reflector adjacent the convex lens.

* * * * *